(12) United States Patent
Nian et al.

(10) Patent No.: US 11,138,448 B2
(45) Date of Patent: Oct. 5, 2021

(54) IDENTIFYING A CURB BASED ON 3-D SENSOR DATA

(71) Applicant: BEIJING DIDI INFINITY TECHNOLOGY AND DEVELOPMENT CO., LTD., Beijing (CN)

(72) Inventors: Xing Nian, Beijing (CN); Jingnan Liu, Beijing (CN); Lu Feng, Beijing (CN); Teng Ma, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 17/131,722

(22) Filed: Dec. 22, 2020

(65) Prior Publication Data

US 2021/0110172 A1    Apr. 15, 2021

Related U.S. Application Data

(63) Continuation of application No. PCT/CN2018/125383, filed on Dec. 29, 2018.

(51) Int. Cl.
  *G06K 9/00* (2006.01)
  *G06K 9/46* (2006.01)

(52) U.S. Cl.
  CPC ....... *G06K 9/00798* (2013.01); *G06K 9/4604* (2013.01)

(58) Field of Classification Search
  None
  See application file for complete search history.

(56) References Cited

U.S. PATENT DOCUMENTS 8,565,958 B1 * 10/2013 Montemerlo ........ G09B 29/106
                                                      701/25
2015/0293216 A1   10/2015 O'Dea et al.
(Continued)

FOREIGN PATENT DOCUMENTS

CN    103226354 A    7/2013
CN    104850834 A    8/2015
(Continued)

OTHER PUBLICATIONS

International Search Report in PCT/CN2018/125383 dated Jun. 27, 2019, 5 pages.
(Continued)

*Primary Examiner* — Matthew C Bella
*Assistant Examiner* — Brian D Shin
(74) *Attorney, Agent, or Firm* — Bayes PLLC

(57) ABSTRACT

Embodiments of the disclosure provide systems and methods for identifying a curb based on 3-D sensor data. The system includes a communication interface configured to receive the 3-D sensor data captured of a scene by a sensor equipped on the vehicle as the vehicle travels along a trajectory. The system further includes a storage configured to store the 3-D sensor data. The system also includes at least one processor. The at least one processor is configured to create a 2-D mesh representation of the 3-D sensor data. The at least one processor is further configured to segment the 2-D mesh representation into a plurality of surfaces. The at least one processor is further configured to identify boundary mesh cells connecting each pair of adjacent surfaces wherein an altitude difference between the pair of adjacent surfaces is higher than a threshold and select mesh cells that align with a direction of the trajectory as corresponding to the curb.

15 Claims, 5 Drawing Sheets

(56) References Cited

U.S. PATENT DOCUMENTS

| | | | |
|---|---|---|---|
| 2016/0026184 A1* | 1/2016 | Stainvas Olshansky | ............... G06K 9/00791 356/4.01 |
| 2018/0188059 A1 | 7/2018 | Wheeler et al. | |
| 2018/0225515 A1 | 8/2018 | Jiang et al. | |

FOREIGN PATENT DOCUMENTS

| CN | 107272019 A | 10/2017 |
|---|---|---|
| CN | 107341453 A | 11/2017 |
| CN | 108090456 A | 5/2018 |

OTHER PUBLICATIONS

Written Opinion in PCT/CN2018/125383 dated Jun. 27, 2019, 4 pages.

Kong, Dong et al., Road Boundary Identification Aldorithm based on 3D LIDAR Point Cloud, Journal of Guangxi University (Nat Sci Ed), 42(3): 855-863, 2017.

Sun, Pengpeng et al., Urban Curb Robust Detection Algorithm based on 3D-LIDAR, Journal of ZhejiangUniversity (Engineering Science), 52(3): 504-514, 2018.

Wende Zhang, LIDAR-Based Road and Road-Edge Detection, 2010 IEEE Intelligent Vehicles Symposium, University of California, 2010, 4 pages.

Xiangdong Wang et al., Road Edge Detection Based on Improved RANSAC and 2D LIDAR Data, 2015 International Conference on Control, Automation, and Information Sciences (ICCAIS), 2015, 6 pages.

* cited by examiner

500

IDENTIFYING A CURB BASED ON 3-D SENSOR DATA

CROSS-REFERENCE TO RELATED APPLICATIONS

This application is a Continuation of International Application No. PCT/CN2018/125383, filed on Dec. 29, 2018, the entire contents of which are hereby incorporated by reference.

TECHNICAL FIELD

The present disclosure relates to identifying a curb in a high-definition map, and more particularly to, identifying a curb in a high-definition map based on 3-D sensor data.

BACKGROUND

Autonomous driving and robotic navigation technologies rely heavily on accurate identification of curbs in a high-definition map. For example, identified curbs can help define the drivable area as well as other road features for autonomous vehicles. On the other hand, identified curbs can also be used for accurately positioning autonomous vehicles.

Road feature identification methods typically use two types of sensor data: 2-D sensor data captured by cameras or 3-D sensor data captured using LiDAR. For example, road features such as lane marks, traffic board and traffic lights can be identified from 2-D sensor data (e.g., images captured by a camera) based on image features such as textures. However, due to the sensitivities to the change of the light, it is hard to identify 3-D features such as curbs within 2-D sensor data. Identification methods using 3-D sensor data are thus better suited for identifying 3-D road features.

A typical curb identifying method based on 3-D sensor data first calculates the 3-D gradient of the sensor data and then determines the gradient change on each of the scanning light. The method then calculates the gradient change points on each of the scanning light using Gaussian Prosses Regression and Iterative Hough transform and fits the gradient change points to a curve that represents the curb. However, this method is sensitive to noise. For example, the method is not suitable when the 3-D sensor data is captured in an area that contains a large number of vehicles and people. Another existing curb identifying method estimates the center and width of a road based on statistics, and then uses filters and region growing to identify the curb. Although this method can be more robust to noise, it fails easily under complicated road conditions.

Embodiments of the disclosure address the above problems by improved systems and methods for identifying a curb.

SUMMARY

Embodiments of the disclosure provide a method for identifying a curb based on 3-D sensor data. The method includes creating, by at least one processor, a 2-D mesh representation of the 3-D sensor data. The method further includes segmenting, by the at least one processor, the 2-D mesh representation into a plurality of surfaces. The method also includes identifying, by the at least one processor, boundary mesh cells connecting each pair of adjacent surfaces wherein an altitude difference between the pair of adjacent surfaces is higher than a threshold. The method also includes selecting mesh cells, among the boundary mesh cells, that align with a direction of the trajectory as corresponding to the curb.

Embodiments of the disclosure also provide a system for identifying a curb based on 3-D sensor data. The system includes a communication interface configured to receive the 3-D sensor data captured of a scene by a sensor equipped on a vehicle as the vehicle travels along a trajectory. The system further includes a storage configured to store the 3-D sensor data. The system also includes at least one processor. The at least one processor is configured to create a 2-D mesh representation of the 3-D sensor data. The at least one processor is further configured to segment the 2-D mesh representation into a plurality of surfaces. The at least one processor is further configured to identify boundary mesh cells connecting each pair of adjacent surfaces wherein an altitude difference between the pair of adjacent surfaces is higher than a threshold and select mesh cells that align with a direction of the trajectory as corresponding to the curb.

Embodiments of the disclosure further provide a non-transitory computer-readable medium having instructions stored thereon that, when executed by one or more processors, causes the one or more processors to perform a method for identifying a curb based on 3-D sensor data. The method includes receiving the 3-D sensor data captured of a scene by a sensor equipped on the vehicle as the vehicle travels along a trajectory. The method further includes creating a 2-D mesh representation of the 3-D sensor data. The method also includes segmenting the 2-D mesh representation into a plurality of surfaces. The method also includes identifying boundary mesh cells connecting each pair of adjacent surfaces wherein an altitude difference between the pair of adjacent surfaces is higher than a threshold and selecting mesh cells, among the boundary mesh cells, that align with a direction of the trajectory as corresponding to the curb.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Figure 1:
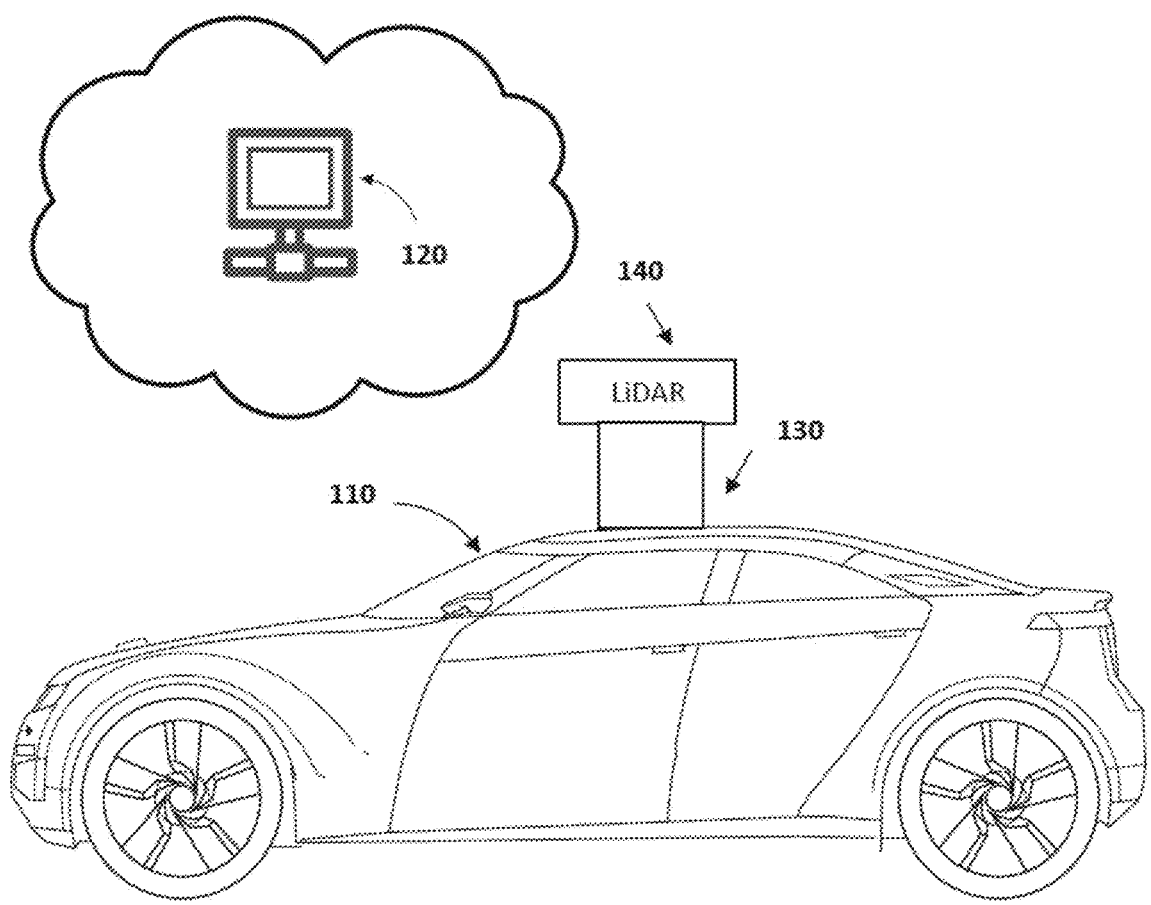
FIG. 1 illustrates a schematic diagram of an exemplary vehicle having sensors, according to embodiments of the disclosure.

FIG. 1 illustrates a schematic diagram of an exemplary vehicle 110 having sensors, according to embodiments of the disclosure. Consistent with some embodiments, vehicle 110 may be a survey vehicle configured for acquiring data for constructing a high-definition (HD) map or three-dimensional (3-D) city modeling. The acquired data may further be used for identifying curbs within the HD map or the 3-D city modeling. It is contemplated that vehicle 110 may be an electric vehicle, a fuel cell vehicle, a hybrid vehicle, or a conventional internal combustion engine vehicle. Vehicle 110 may have a body and at least one wheel. Body may be any body style, such as a sports vehicle, a coupe, a sedan, a pick-up truck, a station wagon, a sports utility vehicle (SUV), a minivan, or a conversion van. In some embodiments, vehicle 110 may include a pair of front wheels and a pair of rear wheels, as illustrated in FIG. 1. However, it is contemplated that vehicle 110 may have less wheels or equivalent structures that enable vehicle 110 to move around. Vehicle 110 may be configured to be all wheel drive (AWD), front wheel drive (FWR), or rear wheel drive (RWD). In some embodiments, vehicle 110 may be configured to be operated by an operator occupying the vehicle, remotely controlled, and/or autonomous.

As illustrated in FIG. 1, vehicle 110 may be equipped with a LiDAR 140 mounted to vehicle 110 via a mounting structure 130. Mounting structure 130 may be an electro-mechanical device installed or otherwise attached to body of vehicle 110. In some embodiments, mounting structure 130 may use screws, adhesives, or another mounting mechanism. Vehicle 110 may be additionally equipped with a GPS/IMU inside or outside the body of vehicle 110 using any suitable mounting mechanisms. It is contemplated that the manners in which LiDAR 140 or the GPS/IMU can be equipped on vehicle 110 are not limited by the example shown in FIG. 1 and may be modified to achieve desirable data collecting performance.

In some embodiments, LiDAR 140 and the GPS/IMU may be configured to capture data as vehicle 110 moves along a trajectory. Consistent with the present disclosure, LiDAR 140 can be configured to scan the surrounding and acquire point clouds. LiDAR measures the distance to a target by illuminating the target with pulsed laser light and measuring the reflected pulses with a sensor. Differences in laser return times and wavelengths can then be used to make digital 3-D representations of the target. The light used for LiDAR scan may be ultraviolet, visible, or near infrared. Because a narrow laser beam can map physical features with very high definition and resolution, a LiDAR scanner is particularly suitable for 3-D sensor data survey. In some embodiments, a LiDAR scanner may capture a point cloud. As vehicle 110 moves along the trajectory, LiDAR 140 may acquire a series of point clouds at multiple time points (each known as a point cloud frame acquired at a time point).

Consistent with the present disclosure, vehicle 110 may communicate with a server 120. In some embodiments, server 120 may be a local physical server, a cloud server (as illustrated in FIG. 1), a virtual server, a distributed server, or any other suitable computing device. Server 120 may communicate with LiDAR 140, the GPS/IMU, and/or other components of vehicle 110 via a network, such as a Wireless Local Area Network (WLAN), a Wide Area Network (WAN), wireless networks such as radio waves, a cellular network, a satellite communication network, and/or a local or short-range wireless network (e.g., Bluetooth™). For example, server 120 may receive 3-D sensor data (e.g., sensor measurements from LiDAR 140 and the GPS/IMU) from LiDAR 140.

Consistent with the present disclosure, server 120 may create a 2-D mesh representation of a target area based on the 3-D sensor data (e.g., point clouds) captured by LiDAR 140 and pose data captured by the GPS/IMU. Server 120 may also segment the 2-D mesh representation into a plurality of surfaces. Boundary mesh cells connecting each pair of adjacent surfaces where the altitude difference between the pair of adjacent surfaces is higher than a predetermined threshold may also be identified by server 120. Server 120 may further select among the boundary mesh cells, the boundary mesh cells that align with the direction of the trajectory to represent curbs. The disclosed systems and methods provide a solution suitable for most of the road types (e.g., regular roads, intersections and 3-way junctions) with more robustness to noise and an increased reliability for identifying curbs.

Figure 2:
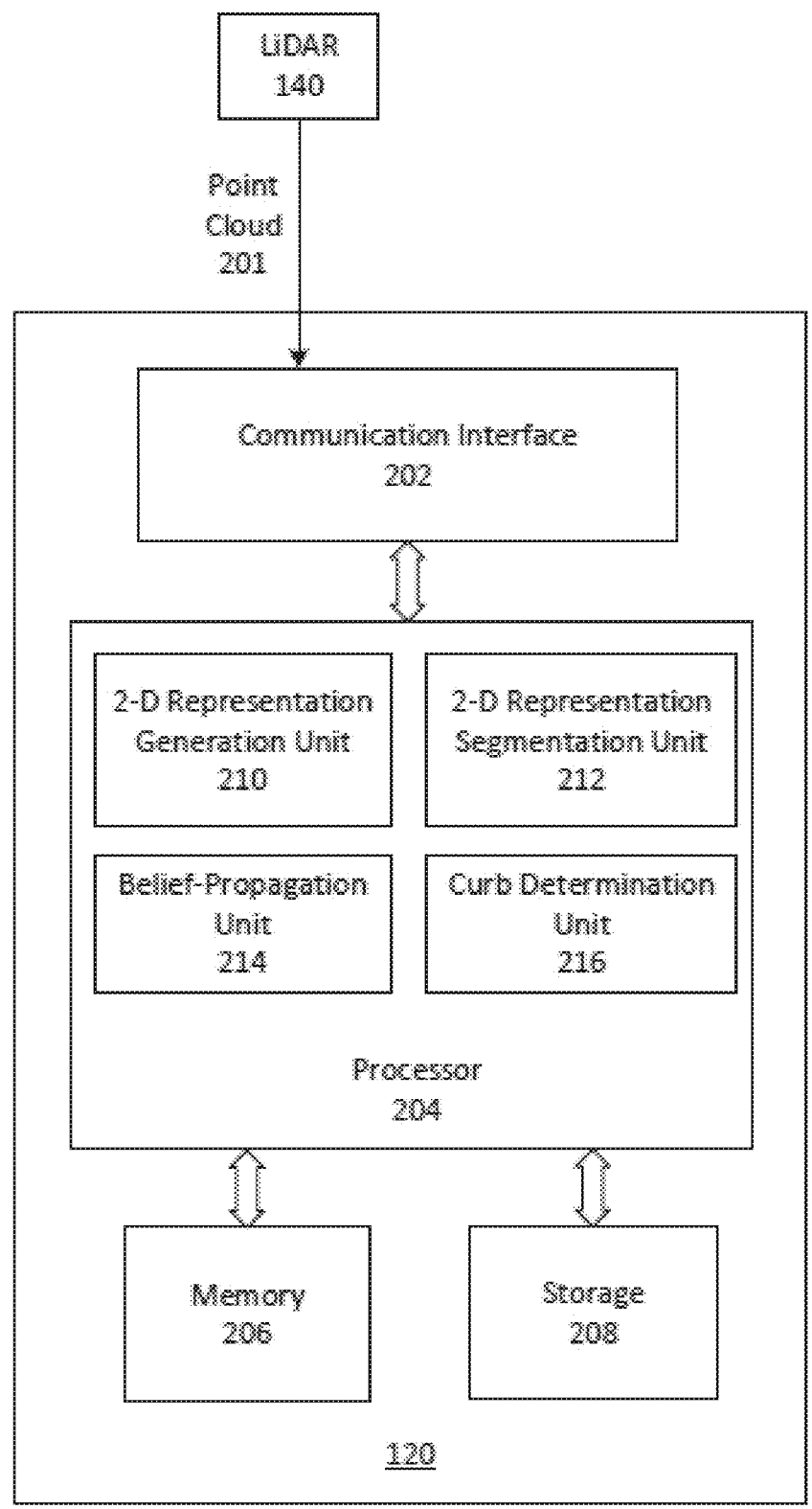
FIG. 2 illustrates a block diagram of an exemplary server for identifying a curb based on 3-D sensor data, according to embodiments of the disclosure.

For example, FIG. 2 illustrates a block diagram of an exemplary server 120 for identifying a curb based on 3-D sensor data, according to embodiments of the disclosure. Consistent with the present disclosure, server 120 may identify curbs based on 3-D sensor data. The 3-D sensor data may be captured by LiDAR 140 and the GPS/IMU equipped on vehicle 110 with respect to a surrounding scene of vehicle 110, as vehicle 110 moves along a trajectory. The data may include a point cloud 201 captured by LiDAR 140 consisting of multiple point cloud frames at various time points.

In some embodiments, data provided to server 120 for identifying curbs may further include GPS data and pose data of vehicle 110 captured by the GPS/IMU (not shown). Point cloud 201 may be transformed from a local coordinate system into a global coordinate system (e.g., the longitude/latitude coordinates) based on the GPS data and the pose data.

In some embodiments, as shown in FIG. 2, server 120 may include a communication interface 202, a processor 204, a memory 206, and a storage 208. In some embodiments, server 120 may have different modules in a single device, such as an integrated circuit (IC) chip (implemented as an application-specific integrated circuit (ASIC) or a field-programmable gate array (FPGA)), or separate devices with dedicated functions. In some embodiments, one or more components of server 120 may be located inside vehicle 110 or may be alternatively in a mobile device, in the cloud, or another remote location. Components of server 120 may be in an integrated device or distributed at different locations but communicate with each other through a network (not shown). For example, processor 204 may be a processor on-board vehicle 110, a processor inside a mobile device, or a cloud processor, or any combinations thereof.

Communication interface 202 may receive data from components such as LiDAR 140 and the GPS/IMU via, e.g., communication cables, a Wireless Local Area Network (WLAN), a Wide Area Network (WAN), wireless networks such as a radio wave network, a cellular network, and/or a local wireless network (e.g., Bluetooth™ or WiFi™), or other communication methods. In some embodiments, communication interface 202 can be an integrated services digital network (ISDN) card, a cable modem, a satellite modem, or a modem to provide a data communication connection. As another example, communication interface 202 can be a local area network (LAN) adaptor to provide a data communication connection to a compatible LAN. Wireless links can also be implemented by communication interface 202. In such an implementation, communication interface 202 can send and receive electrical, electromagnetic or optical signals that carry digital data streams representing various types of information.

Consistent with some embodiments, communication interface 202 may receive data captured by LiDAR 140, including point cloud 201. The received data may be provided to memory 206 and/or storage 208 for storage or to processor 204 for processing. Communication interface 202 may also receive the identified curb information generated by processor 204, and provide the information to any local component in vehicle 110 or any remote device via a communication link (not shown). For example, the curb information may be provided to an autonomous driving vehicle.

Processor 204 may include any appropriate type of general-purpose or special-purpose microprocessor, digital signal processor, or microcontroller. Processor 204 may be configured as a separate processor module dedicated to identifying curbs. Alternatively, processor 204 may be configured as a shared processor module that can also perform other functions unrelated to curb identification.

As shown in FIG. 2, processor 204 may include multiple modules/units, such as a 2-D representation generation unit 210, a representation segmentation unit 212, a belief-propagation unit 214, a curb determination unit 216, and the like. These modules/units (and any corresponding sub-modules or sub-units) can be hardware units (e.g., portions of an integrated circuit) of processor 204 designed for use with other components or to execute at least part of a program. The program may be stored on a computer-readable medium, and when executed by processor 204, it may perform one or more functions or operations. Although FIG. 2 shows units 210-216 all within one processor 204, it is contemplated that these units may be distributed among multiple processors located closely to or remotely from each other.

In some embodiments, 2-D representation generation unit 210 may be configured to create a 2-D representation of point cloud 201. In some embodiments, 2-D representation generation unit 210 may project point cloud 201 to a 2-D mesh representation and determine a set of parameters for each mesh cell within the 2-D mesh representation, including, e.g., coordinates of a central cell, a lower left corner cell, an upper right corner cell and an altitude of each respective cell. For example, 2-D representation generation unit 210 may generate a digital evaluation map based on point cloud 201. In some embodiments, the altitude of the mesh cell may be represented in form of a normal distribution using Equation (1):

$$p(h_i | \mu_{h_i}, \sigma_{h_i}^2) = N(h_i | \mu_{h_i}, \sigma_{h_i}^2) \qquad (1)$$

where $h_i$ is the altitude of the mesh cell, $\mu_{h_i}$ is the mean of the normal distribution, and $\sigma_{h_i}^2$ is the variance of the normal distribution. The set of the parameters for each mesh cell may be determined based on statistical values of the altitude associated with each mesh cell.

In some embodiments, 2-D representation segmentation unit 212 may be configured to segment the 2-D mesh representation of point cloud 201. For example, the 2-D mesh representation may be segmented using a thresholding method. For example, mesh cells with altitudes higher than a certain threshold is segmented as in a different surface as those mesh cells with altitudes lower than the threshold. Other suitable segmentation methods, such as based on a learning network, may also be used.

Figure 4:
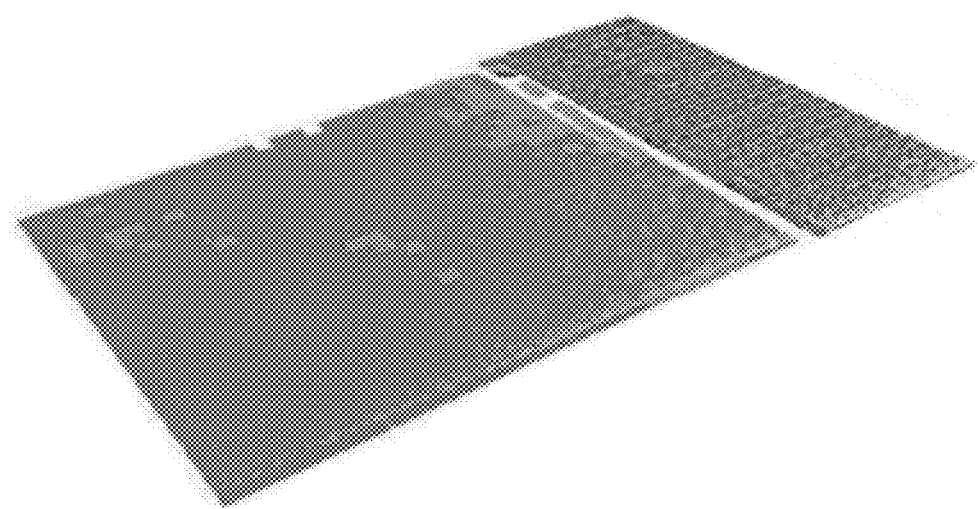
FIG. 4 illustrates an exemplary 2-D segmentation of a digital elevation map, according to embodiments of the disclosure.

FIG. 4 illustrates an exemplary 2-D segmentation 400 of the digital elevation map, according to embodiments of the disclosure. As shown in FIG. 4, mesh cells with different altitudes (colored differently) are segmented into different surfaces. For example, the segmented surfaces may be color-coded in a way that the darker the cell's color is, the lower the cell's altitude is or the opposite. It is to be appreciated that any other suitable segmentation methods may be used for segmenting the 2-D representation so long as the segmentation is based on the altitude of each mesh cell. In some embodiments, 2-D representation segmentation unit 212 may be configured to use an expectation-maximization method to estimate the maximum likely estimation of the altitude of each mesh cell.

Referring back to FIG. 2, based on the segmentation of the 2-D representation, belief-propagation unit 214 may be configured to refine the segmentation. For example, belief-propagation unit 214 may adjust and/or update the statistical value of the altitude of each mesh cell and refine the segmentation of the 2-D representation based on the adjusted and/or updated statistical value of the altitude. In some embodiments, belief-propagation unit 214 may adjust the variance of the altitude of each mesh cell based on the constraints between two adjacent mesh cells using a belief-propagation algorithm. In some embodiments, when only a subset of mesh cells are associated with actually captured data (referred to as "observed mesh cells"), belief-propagation unit 214 may estimate data for unobserved mesh cells based on the observed mesh cells. For example, belief-propagation unit 214 may further calculate a marginal distribution for any unobserved mesh cells based on these observed mesh cells using a polytree structure. This allows data of the marginal mesh cells to be computed much more efficiently compared to using a complete marginalization, which can quickly become computationally prohibitive as the variable's number become larger.

Figure 5:
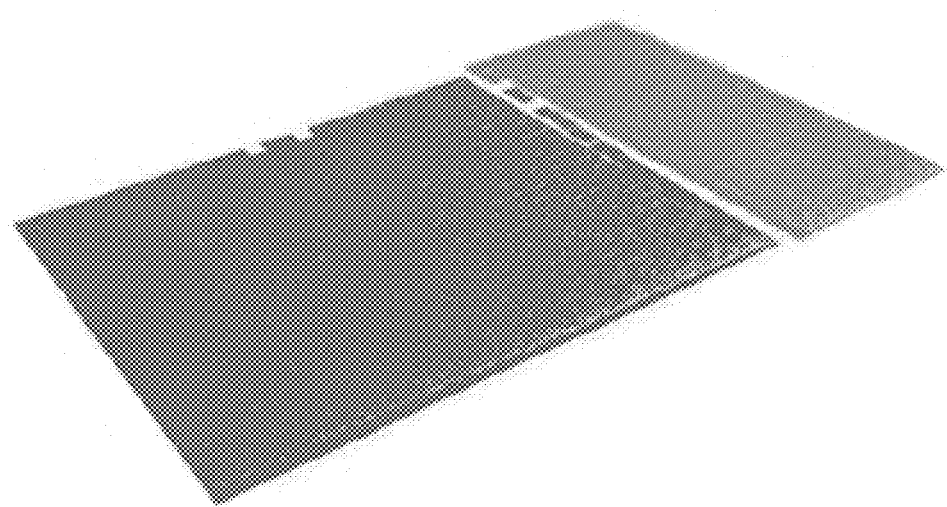
FIG. 5 illustrates an exemplary 2-D refined segmentation of the digital elevation map, according to embodiments of the disclosure.

FIG. 5 illustrates an exemplary 2-D refined segmentation 500, according to embodiments of the disclosure. As shown in FIG. 5, 2-D segmentation 400 generated by 2-D representation segmentation unit 212 may be further segmented into color-coded surfaces that includes mesh cells that has an altitude within a certain range (e.g., mesh cells with an altitude between 40 centimeters and 42.5 centimeters and are connected with each other may be segmented as within the same surface). The edge of the surfaces (the connecting mesh cells) may be identified in the refined segmentation 500 (e.g., the line between the left surface and the right surface) and may be identified as candidates for boundary mesh cells for curb determination unit 216.

Referring back to FIG. 2, based on refined segmentation 500, curb determination unit 216 may be configured to determine an altitude difference between the two adjacent surfaces. Curb determination unit 216 may determine if the altitude difference between the two different surfaces is larger than a predetermined threshold (e.g., the predetermined threshold may be set as 25 centimeter). If the difference is larger than the predetermined threshold, curb determination unit 216 may identify the edge of the surfaces (the connecting mesh cells between the two adjacent surfaces) as boundary mesh cells. Otherwise, curb determination unit 216 may return to determining the difference between another two adjacent surfaces. In some embodiments, curb determination unit 216 may further select boundary mesh cells that align with direction of the trajectory as corresponding to a curb. For example, if the trajectory is from the left to the right of the refined 2-D representation, only boundary mesh cells that aligns horizontally (e.g., from left to right or from right to left) may be selected as corresponding to a curb. In some embodiments, the direction of the trajectory may be pre-set for curb determination unit 216. For example, vehicle 110 may send a signal indicating the direction of the trajectory to communication interface 202 and communication interface 202 may communicate the direction to curb determination unit 216 for mesh cells selection. In some other embodiments, the direction of the trajectory may be determined by curb determination unit 216 based on the GPS and IUM data captured by the GPS/IMU.

In some embodiments, curb determination unit 216 may use curve fitting to select mesh cells corresponding to the curb. For example, the mesh cells representing a curb may be selected based on parabolically fitting the boundary mesh cells with the direction of the trajectory. In some embodiments, curb determination unit 216 may use a random sample consensus (RANSAC) method to score the selected boundary mesh cells (mesh cells along each different fitting parabolas) and select the mesh cells along the highest scored parabola to represent the curb.

As the boundary mesh cells are selected according to the direction of the trajectory, unnecessary noise may be reduced. This can increase the robustness and accuracy of the curb identification method and can acquire a more reliable curb identification result.

Memory 206 and storage 208 may include any appropriate type of storage device provided to store any type of information that processor 204 may need to process. Memory 206 and storage 208 may be volatile or non-volatile, magnetic, semiconductor-based, tape-based, optical, removable, non-removable, or other type of storage device or tangible (i.e., non-transitory) computer-readable medium including, but not limited to, a ROM, a flash memory, a dynamic RAM, and a static RAM. Memory 206 and/or storage 208 may be configured to store one or more computer programs that may be executed by processor 204 to perform curb identification disclosed herein. For example, memory 206 and/or storage 208 may be configured to store program(s) that may be executed by processor 204 to process the data captured by LiDAR 140 and/or the GPS/IMU to identify the curb within point cloud 201.

Memory 206 and/or storage 208 may be further configured to store information and data used by processor 204. For instance, memory 206 and/or storage 208 may be configured to store the various types of data captured by LiDAR 140 and the GPS/IMU and the segmentation and the refined segmentation of the 2-D representation of point cloud 201. The various types of data may be stored permanently, removed periodically, or disregarded immediately after each frame of data is processed.

Figure 3:
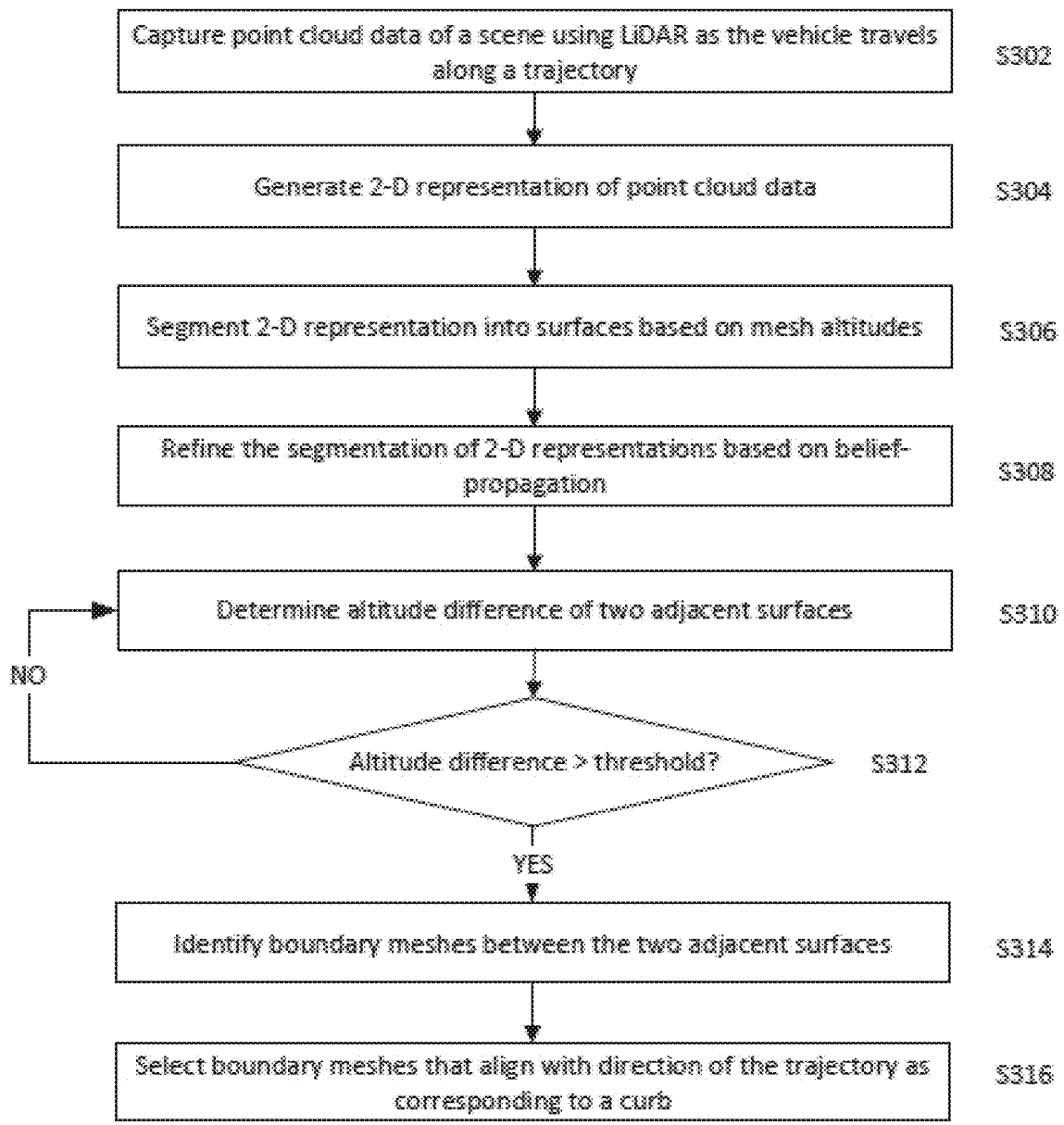
FIG. 3 illustrates a flowchart of an exemplary method for identifying a curb based on 3-D sensor data, according to embodiments of the disclosure.

FIG. 3 illustrates a flowchart of an exemplary method 300 for identifying a curb, according to embodiments of the disclosure. For example, method 300 may be implemented by a curb identification system that includes, among other things, server 120, and LiDAR 140. However, method 300 is not limited to that exemplary embodiment.

Method 300 may include steps S302-S316 as described below. It is to be appreciated that some of the steps may be optional to perform the disclosure provided herein. Further, some of the steps may be performed simultaneously, or in a different order than shown in FIG. 3.

In step S302, point cloud data (e.g., point cloud 201) may be captured with respect to a target area at certain time point. In some embodiments, GPS and/or pose data of vehicle 110 may also be captured by the GPS/IWU at the time point that the point cloud data was captured. The GPS and/or pose data may correspond to the point cloud data as they are captured at the same time point. In some embodiments, the captured point cloud data, GPS data and pose data may be sent to and received by server 120.

In step S304, a 2-D representation of point cloud data 201 may be generated based on point could 201. For example, server 120 may project point could 201 to a 2-D mesh representation and determine a set of parameters for each mesh in the 2-D mesh representation, e.g., coordinates of a central cell, a lower left corner cell, an upper right corner cell and an altitude of each respective cell. In some embodiments, the 2-D representation may be a digital elevation map generated based on point cloud 201. In some embodiments, the altitude of the mesh within the digital elevation map may be represented in form of a normal distribution using Equation (1):

$$p(h_i|\mu_h, \sigma_{h_i}^2) = N(h_i|\mu_h, \sigma_{h_i}^2) \tag{1}$$

where $h_i$ is the altitude of the mesh, $\varphi_h$ is the mean of the normal distribution, and $\sigma_{h_i}^2$ is the variance of the normal distribution. The set of the parameters for each mesh may be determined based on statistical values of the altitude associated with each mesh.

In step S306-S308, server 120 may segment and refine the segmentation of the 2-D representation based on mesh cells' altitudes using message passing algorithms suitable for performing inference on graphical models (e.g., a belief propagation algorithm). In some embodiments, in step S306, server 120 may segment the 2-D representation based on point cloud 201 captured by LiDAR 140. For example, 2-D representation may be segmented using a thresholding method. For example, mesh cells with altitudes higher than a certain threshold is segmented as in a different surface as those mesh cells with altitudes lower than the threshold. Other suitable segmentation methods, such as based on a learning network, may also be used. In some embodiments, the segmented surfaces may be color-coded in a way that different color represents mesh cells with different altitude (e.g., darker colors may represent mesh cells with lower altitude). In some embodiments, server 120 may use an iterative method to find maximum likelihood of the altitude of each mesh. For example, server 120 may use an expectation-maximization method to estimate the maximum likelihood of each mesh's altitude estimation. Based on the estimation of each mesh's altitude, the digital elevation map may be segmented by server 120.

In step S308, server 120 may refine the segmentation of the 2-D representation using a message passing algorithm suitable for performing inference on graphical models (e.g., a belief propagation algorithm). For example, server 120 may adjust and/or update the statistical value of the altitude of each mesh and refine the segmented 2-D representation based on the adjusted and/or updated statistical value of the altitude. In some embodiments, the statistical value of the altitude of each mesh used for adjustment and/or update may be the variance of the altitude. In some embodiments, server 120 may adjust the variance of the altitude of each mesh based on the constraints between two adjacent mesh cells and use the belief-propagation algorithm to refine the segmentation generated in step S306. In some embodiments, the segmentation generated in step S306 may be further refined into different color-coded surfaces based on the altitude of the mesh cells (e.g., connecting mesh cells with an altitude difference less than a predetermined value may be segmented into the same surface). The edge of the surfaces may be identified in the refined segmentation as candidates for boundary mesh cells.

In step S310-S316, server 120 may select mesh cells correspond to a curb based on the refined segmentation. In step S310, server 120 may determine the altitude difference of two adjacent surfaces. For example, server 120 may calculate the difference of edges identified in step S308. In step S312, server 120 may determine if the altitude difference is larger than a predetermined threshold (e.g., the predetermined threshold may be set as 25 centimeter). In step S314, if the difference is larger than the predetermined threshold, edges of the two adjacent surfaces may be identified as boundary mesh cells and may be identified as candidates of being selected as mesh cells representing a curb. Otherwise, method 300 returns to step S310 in which server 120 may determine altitude difference of another two adjacent surfaces.

In step S316, server 120 may further select boundary mesh cells that align with the direction of the trajectory as corresponding to a curb. For example, if the trajectory is from the left to the right in the refined segmentation of 2-D representation, only boundary mesh cells that aligns horizontally (e.g., from left to right or from right to left) may be selected as corresponding to a curb. In some embodiments, the direction of the trajectory may be pre-set for server 120. For example, vehicle 110 may send a signal indicating the direction of the trajectory to server 120. In some other embodiments, the direction of the trajectory may be determined by server 120 based on the GPS and pose data captured by the GPS/IMU.

In some embodiments, server 120 may further use curve fitting to select mesh cells corresponding to the curb. For example, the curb may be selected based on parabolically fitting the boundary mesh cells with the direction of the trajectory. In some embodiments, server 120 may use a random sample consensus (RANSAC) method to score the selected boundary mesh cells (along each different fitting parabolas) and use the selected mesh cells with the highest score to represent the curb.

Based on using the direction of the trajectory to select boundary mesh cells, less mesh cells will be determined as a potential representation of a curb. Not only may the method reduce the overall computation by pre-filtering boundary mesh cells, but the method may also increase the robustness and accuracy of the curb identification. Thus, the method may generate a more reliable curb identification result and is applicable to identify curbs under more complicated road conditions.

Another aspect of the disclosure is directed to a non-transitory computer-readable medium storing instructions which, when executed, cause one or more processors to perform the methods, as discussed above. The computer-readable medium may be volatile or non-volatile, magnetic, semiconductor-based, tape-based, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. A method for identifying a curb based on 3-D sensor data, comprising:
   receiving the 3-D sensor data captured of a scene by a sensor equipped on a vehicle as the vehicle travels along a trajectory;
   creating, by at least one processor, a 2-D mesh representation of the 3-D sensor data;
   determining a set of parameters for each mesh in the 2-D mesh representation, including a central coordinate, a lower left corner coordinate, an upper right corner coordinate and an altitude of the mesh, based on statistical values of the altitude associated with each mesh;
   segmenting, by the at least one processor, the 2-D mesh representation into a plurality of surfaces;
   identifying, by the at least one processor, boundary mesh cells connecting each pair of adjacent surfaces wherein an altitude difference between the pair of adjacent surfaces is higher than a threshold; and
   selecting mesh cells, among the boundary mesh cells, that align with a direction of the trajectory as corresponding to the curb.

2. The method of claim 1, wherein the 2-D mesh representation is a digital elevation map.

3. The method of claim 1, wherein the altitude is represented in a form of a normal distribution.

4. The method of claim 1, further comprising computing the statistical values using an expectation-maximization algorithm.

5. The method of claim 1, further comprising:
   adjusting the statistical values of the altitude associated with each mesh based on a belief-propagation algorithm; and
   segmenting the 2-D mesh representation based on the adjusted statistical values.

6. The method of claim 1, wherein the 3-D sensor data is point cloud data captured by a LiDAR.

7. The method of claim 1, wherein the mesh cells corresponding to the curb are selected based on parabolically fitting the boundary mesh cells with the direction of the trajectory.

8. A system for identifying a curb based on 3-D sensor data, comprising:
   a communication interface configured to receive the 3-D sensor data captured of a scene by a sensor equipped on a vehicle as the vehicle travels along a trajectory;
   a storage configured to store the 3-D sensor data; and
   at least one processor configured to:
   create a 2-D mesh representation of the 3-D sensor data;
   determine a set of parameters for each mesh in the 2-D mesh representation, including a central coordinate, a lower left corner coordinate, an upper right corner coordinate and an altitude of the mesh, based on statistical values of the altitude associated with each mesh;
   segment the 2-D mesh representation into a plurality of surfaces;
   identify boundary mesh cells connecting each pair of adjacent surfaces wherein an altitude difference between the pair of adjacent surfaces is higher than a threshold; and;
   select mesh cells that align with a direction of the trajectory as corresponding to the curb.

9. The system of claim 8, wherein the 2-D mesh representation is a digital elevation map.

10. The system of claim 8, wherein the altitude is represented in a form of a normal distribution.

11. The system of claim 8, the at least one processor is further configured to compute the statistical values using an expectation-maximization algorithm.

12. The system of claim 8, wherein the at least one processor is further configured to:

adjust the statistical values of the altitude associated with each mesh based on a belief-propagation algorithm; and segment the 2-D mesh representation based on the adjusted statistical values.

13. The system of claim 8, wherein the 3-D sensor data is point cloud data captured by a LiDAR.

14. The system of claim 8, wherein the mesh cells corresponding to the curb are selected based on parabolically fitting the boundary mesh cells with the direction of the trajectory.

15. A non-transitory computer-readable medium having instructions stored thereon that, when executed by one or more processors, causes the one or more processors to perform a method for identifying a curb based on 3-D sensor data comprising:

receiving the 3-D sensor data captured of a scene by a sensor equipped on a vehicle as the vehicle travels along a trajectory;

creating a 2-D mesh representation of the 3-D sensor data;

determining a set of parameters for each mesh in the 2-D mesh representation, including a central coordinate, a lower left corner coordinate, an upper right corner coordinate and an altitude of the mesh, based on statistical values of the altitude associated with each mesh;

segmenting the 2-D mesh representation into a plurality of surfaces;

identifying boundary mesh cells connecting each pair of adjacent surfaces wherein an altitude difference between the pair of adjacent surfaces is higher than a threshold; and selecting mesh cells, among the boundary mesh cells, that align with a direction of the trajectory as corresponding to the curb.

* * * * *